United States Patent [19]

Reedy et al.

[11] Patent Number: 5,002,089
[45] Date of Patent: Mar. 26, 1991

[54] VARIABLE AREA REFRIGERANT EXPANSION DEVICE FOR HEATING MODE OF A HEAT PUMP

[75] Inventors: Wayne R. Reedy, Edwardsville, Ill.; Alan S. Drucker, Dewitt, N.Y.

[73] Assignee: Carrier Corporation, Syracuse, N.Y.

[21] Appl. No.: 502,895

[22] Filed: Apr. 2, 1990

[51] Int. Cl.⁵ .............................................. G05D 16/06
[52] U.S. Cl. .................... 137/493.8; 62/324.6; 137/505.35
[58] Field of Search ............... 62/222, 324.1, 324.6; 137/493, 493.8, 504, 505.29, 505.34, 505.35

[56] References Cited

U.S. PATENT DOCUMENTS

| 583,546 | 6/1897 | Pierson | 137/505.35 X |
| 2,398,503 | 4/1946 | Paasche | 137/505.34 |
| 3,037,362 | 6/1962 | Tilney | 62/222 X |
| 3,503,417 | 3/1970 | Toda | 137/504 X |
| 4,341,090 | 7/1982 | Ramakrishnan | 62/324.6 X |

Primary Examiner—Robert G. Nilson
Attorney, Agent, or Firm—Frederick A. Goettel, Jr.

[57] ABSTRACT

A refrigerant flow metering device for use in a refrigeration system includes a housing having a flow metering passage extending therethrough. A partition is located within the flow passage of the housing and defines a flow metering port therethrough. The partition divides the flow passage into a high pressure and a low pressure portion. An elongated member extends into the metering port. The elongated member and the metering port cooperate to define a flow metering passage therebetween. The elongated member is configured to vary the cross-sectional area of the flow metering passage in relation to the position of the elongated member to the flow metering port. One end of the elongated rod extends into the low pressure portion of the flow passage. Means are provided for supporting the elongated member within the flow passage and for controlling the axial position of the elongated member within the passage in response to the differential pressure between refrigerant in the low pressure portion and atmospheric pressure.

12 Claims, 2 Drawing Sheets

VARIABLE AREA REFRIGERANT EXPANSION DEVICE FOR HEATING MODE OF A HEAT PUMP

BACKGROUND OF THE INVENTION

1. Field of the Invention.

This invention relates in general to refrigerant expansion devices used in a heat pump. More specifically, this invention relates to an expansion device that has a variable expansion area that is operated by the pressure differential existing between ambient pressure and the low pressure side of a heat pump system.

2. Description of the Prior Art.

A compression refrigeration system comprises a compressor, a condenser, an expansion device and an evaporator connected in a closed circuit to provide refrigeration. Hot compressed refrigerant vapor from the compressor enters the condenser, where it transfers heat to an external heat exchange medium and condenses. Condensed refrigerant, at a high pressure, flows through the expansion device, where the refrigerant undergoes a pressure drop and at least partially flashes to a vapor. The liquid-vapor mixture then flows through the evaporator where it evaporates and absorbs heat from the external surroundings. The low pressure refrigerant vapor then returns to the compressor to complete the circuit.

Although the expansion device is often of simple construction, its role in the refrigeration system is crucial. Ideally, the expansion device should meter refrigerant in a manner such that refrigerant leaving the evaporator is super-heated by a controlled, relatively small amount. The foregoing is desired to prevent any damaging liquid refrigerant from entering the compressor, and to avoid subjecting the compressor to excessive temperatures from highly super-heated vapor.

The performance of the expansion device plays an important role not only in protecting the compressor, but also in determining the cooling capacity of the refrigeration system. Since the system is a closed circuit, any effect the device has on the low or evaporator side is intimately tied in with the performance of the high or condenser side. Most conventional air conditioning systems incorporating compression refrigeration units of the kind described are designed to have a predetermined cooling capacity at a given ambient temperature. The capacity of the system usually decreases at ambient temperatures above the design point. The decrease in capacity of the system at temperatures above the design point has a direct effect on the requirements related to the type of expansion device.

Among the most commonly used expansion devices are thermostatic expansion valves, capillary tubes and other fixed orifice devices. Thermostatic expansion valves control the flow rate of liquid refrigerant entering the evaporator as a function of the temperature of the refrigerant gas leaving the evaporator. This control is achieved by varying the cross-sectional area through a needle type valve contained within the valve body. The needle is typically joined to a flexible metal bellows or diaphragm which is, in turn, actuated by a non-heat conducting rod connected at its other end to a sealed bellows. The sealed bellows, in turn, is joined to a thermostatic sensing bulb by means of a capillary tube. This bulb provides the feedback to the valve of the temperature of the refrigerant leaving the evaporator and the valve responds by increasing or decreasing the flow of refrigerant through the needle valve according to this temperature. While being highly efficient in their operation and readily responsive to changes in load upon the system to vary the flow of refrigerant to the evaporator, thermostatic expansion valves are also complicated and relatively expensive. Further, in split system type air conditioning systems, wherein the compressor and condenser are located outside at a remote location from the evaporator, the distance of the sensing bulb from the compressor result in less than optimum conditions in such systems.

Capillary tubes are generally used in place of thermostatic expansion valves, particularly in smaller applications, wherein ambient air is almost universally utilized as the condensing medium. Although capillary tubes are relatively inexpensive to manufacture and are simple to install, they have some serious operating limitations, particularly when they are operating at conditions above or below the design point of the system.

As an example, as the outdoor ambient temperature increases there is a large increase in the pressure differential across the expansion device. However, the pressure ratio across the compressor, and likewise the flow rate pumped by the compressor remain about the same. Because of the higher pressure, but the same flow rate, the amount of subcooling of the refrigerant entering the expansion device drops, which means that there is now less refrigerant residing in the high side of the system. To conserve total refrigerant in the system, it follows, that the evaporator must contain more refrigerant and this causes the superheat of the refrigerant leaving the evaporator to drop. As a result, at times, a portion of the refrigerant flow to the evaporator will not be evaporated and will remain in its liquid state as it passes from the evaporator to the compressor. The introduction of liquid refrigerant into the compressor may produce serious problems, such as breaking valves, in addition to a decrease of the efficiency of operation of the compressor.

An additional problem is found at relatively low ambient temperatures, wherein the pressure differential across the expansion device is of a relatively small magnitude. Under these conditions the subcooling of the refrigerant entering the expansion device increases as the outdoor ambient temperature falls, leading to more refrigerant being stored in the condenser, which starves the evaporator. As a result, more of the evaporator becomes filled with superheated vapor and the superheat leaving the evaporator increases. Using increased evaporator surface to superheat refrigerant is not putting the surface to its most effective use.

Another known fixed orifice expansion device is the orifice plate. Very simply, an orifice plate comprises a thin plate having an expansion orifice extending therethrough. Orifice plates are small and inexpensive, but they are erratic in performance. Hence, such plates are not in wide use.

In an attempt to provide an alternate expansion device, having the economical advantages of the capillary tube, while being smaller and more efficient in operation, the expansion device described in commonly assigned U.S. Pat. No. No. 3,642,030 entitled "Refrigerant Throttling Device" and issued on Feb. 15, 1972 in the name of Larry D. Amick was developed. That device comprises a body member having a tubular insert having prescribed length-to-bore diameter ratios, a conical inlet, and a conical exit.

Continuing efforts to develop an economical, efficient and effective fixed orifice expansion device resulted in the development of the expansion device described in commonly assigned U.S. Pat. No. 3,877,248 entitled "Refrigerant Expansion Device" which issued Mar. 1, 1974 in the name of Fred V. Honnold, Jr. That device comprises a body having an expansion conduit extending therethrough with a flat entrance presenting a sharp edge orifice to incoming refrigerant. The sharp edge entrance orifice effects a major portion of the refrigerant pressure drop at the entrance, so that only a short conduit length is necessary to effect the balance of the pressure drop demanded of the device. The body member is incorporated in a unitary coupling member configured to join refrigerant lines from the condenser to the evaporator.

Commonly assigned U.S. Pat. No. 3,992,898 entitled "Moveable Expansion Valve" which issued Nov. 23, 1976, in the name of Richard J. Duell and John A. Ferrel represents a further refinement of a fixed orifice expansion device. In the device of this patent, the refrigerant metering port is formed in a free floating piston which is mounted within a chamber. When refrigerant flows through this device in one direction, the free floating piston moves to one position wherein the refrigerant flow is through the metering port thereby serving as an expansion device. When refrigerant flows through this device in the opposite direction, the free floating piston moves to a second position wherein refrigerant is allowed to flow through a number of flow channels formed in the outer peripheral surface of the piston to thereby allow substantially unrestricted flow through the device. This arrangement allows such a device to be used, in combination with a second expansion device of the same design, in a heat pump system to allow the desired expansion of the refrigerant through the system flowing in both the cooling and heating directions.

In a cooling only system the expansion device of the '898 patent allows a system to be adjusted as to the amount of refrigerant superheat and other expansion parameters by changing the piston contained within the valve body in the field. The piston usually is changed to match the diameter of the metering port, running the length of the piston, with the requirements of a particular system to optimize performance.

U.S. Pat. No. 4,263,787, issued to the assignee hereof, entitled "Expansion Device with Adjustable Refrigerant Throttling" which issued Apr. 28, 1981 to Albert A. Domingorena relates to an improvement of the device of the '898 patent which allows adjusting the diameter of the metering port without having to break into the refrigeration circuit of the system to change the piston.

Summing up the state of the prior art, thermostatic expansion valves, while being highly efficient in their operation and readily responsive to changes in load upon the system to vary the flow of refrigerant to the evaporator, are complicated, expensive, and have drawbacks in certain applications. For this reason they are generally not employed in small applications. As a result, capillary tubes or other fixed orifice expansion devices are generally used in such small applications. Such devices are relatively inexpensive, however, as discussed above, they have operating limitations at both high and low ambient temperatures.

From the foregoing, it is evident that the need exists for a refrigerant expansion device which is inexpensive to manufacture and which is effective in performance over a wide range of operating conditions.

One approach to solving this problem has been to design a refrigerant flow metering device which has a flow metering passage which varies in cross-section in response to changes between the high and low side pressures in the refrigeration system. One such device is described in commonly assigned U.S. Pat. No. 3,659,433 entitled "Refrigeration System Including a Flow Metering Device" issued on May 2, 1972 in the name of David N. Shaw.

It is well known by refrigeration design engineers that, for every operating condition of a refrigeration system, there are optimum values of certain parameters, (e.g., subcooling and superheat), that can maximize performance of any given system. It is also well known that, for a given refrigeration system, operating at given conditions, the design tools are available, i.e., through analysis or through use of a design program, to determine the optimum expansion area in an expansion device that will result in such optimum parameters.

A refrigerant expansion device that is capable of responding to certain pressure and flow conditions to provide such optimum expansion areas within the device for such pressure and flow conditions is disclosed and claimed in commonly assigned U.S. patent application Ser. No. 473,481, filed on Feb. 1, 1990 entitled "Variable Area Refrigerant Expansion Device.

This application discloses a fluid flow metering device which has a housing with a flow passage extending therethrough. Mounted within the housing is a piston having a flow metering port extending axially therethrough. The piston is mounted such that it is moveable within the flow passage. An elongated member is also provided within the housing and extends into the metering port of the piston. The elongated member and the metering port cooperate to define a flow metering passage between them. The elongated member is configured such that the cross-sectional area of the flow metering passage varies in relation to the position of the elongated member to the flow metering port. Means are provided for supporting the elongated member within the housing and for controlling the axial position of the elongated member and the piston with respect to one another as a function of the differential pressure across the flow metering piston.

As discussed above in connection with the '898 patent, it is common practice to use two fixed orifice expansion devices in a heat pump system. One expansion device is dedicated to metering refrigerant in the cooling mode of operation, while the other device allows free bypass flow. Likewise, the other expansion device is dedicated to metering in the heating mode, during which time the cooling expansion device allows free bypass flow. In such a system, the expansion area of the heating expansion device is, as a rule, smaller than the expansion area of the cooling expansion device.

This sizing reflects the operating conditions experienced by the system during the cooling and heating modes of operation. Several examples of problems encountered with a cooling refrigeration system at outdoor temperature extremes were given previously. The problems experienced by a refrigeration system in the heating mode of operation are different, and in appreciation of this facilitates an understanding of why an expansion device optimized for the heating mode is desirable.

As an example of the above, in the heating mode of operation, as the outdoor ambient temperature increases there is an increase in the pressure differential across the expansion device and an accompanying increase in flow rate. However, the increased pressure ratio across the compressor results in a decreased flow rate pumped by the compressor. As a result, at times, a portion of the refrigerant flow to the evaporator will not be evaporated and will remain in its liquid state as it passes from the evaporator to the compressor. The problems associated with this are well known and have been pointed out hereinabove.

An additional problem, in the heating mode, is found at relatively low ambient temperatures, wherein the pressure differential across the system is of a relatively small magnitude which results in a low flow through the expansion device while the compressor is pumping a high flow rate, which starves the evaporator. As a result, more of the evaporator becomes filled with superheated vapor and the superheat leaving the evaporator increases. Using increased evaporator surface to superheat refrigerant is not putting the surface to its most effective use.

As a general rule, when a heat pump is operating in the heating mode of operation, it is desirable that the refrigerant flow rate be greater at high evaporator pressures (as a result of high outdoor ambient temperature). While as the evaporator pressure decreases (as a result of decreasing outdoor ambient temperature), reduced flow metering area and thus decreased refrigerant flow rate is desired. Such decreased refrigerant flow rate is commensurate with the lower compressor pumping rate at the lower evaporator pressure.

It is accordingly deemed desirable to have a variable area expansion device which is capable of responding to the available system conditions which will allow the device to vary the flow metering passage in accordance with the above noted requirements of a heat pump during the heating mode of operation.

SUMMARY OF THE INVENTION

It is an object of the present invention to meter the flow of refrigerant in a refrigerant expansion device as a function of the pressure differential between the low pressure side of the system and atmospheric pressure.

It is another object of the present invention to meter the flow of refrigerant in a refrigerant expansion device such that a reduced flow is achieved at low ambient temperatures and an increased flow is allowed at higher ambient temperatures.

It is a further object of this invention to provide a refrigerant expansion device which shuts off the flow of refrigerant therethrough at very high suction pressure.

It is a related object of the present invention to achieve these and other objects with a simple, safe, economical and reliable expansion device.

These and other objects of the present invention are achieved by an expansion device for metering the flow of refrigerant therethrough, which has a housing having a flow passage extending therethrough. A partition is located within the flow passage of the housing and defines a flow metering port therethrough. The partition divides the flow passage into a high pressure and a low pressure portion. An elongated member extends into the metering port. The elongated member and the metering port cooperate to define a flow metering passage therebetween. The elongated member is configured to vary the cross sectional area of the flow metering passage in relation to the position of the elongated member to said port. One end of the elongated rod extends into the low pressure portion of the flow passage. Means are provided for supporting the elongated member within the flow passage and for controlling the axial position of the elongated member within the passage in response to the differential pressure between refrigerant in the low pressure portion and atmospheric pressure.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DESCRIPTION OF THE PREFERRED EMBODIMENT

Figure 1:
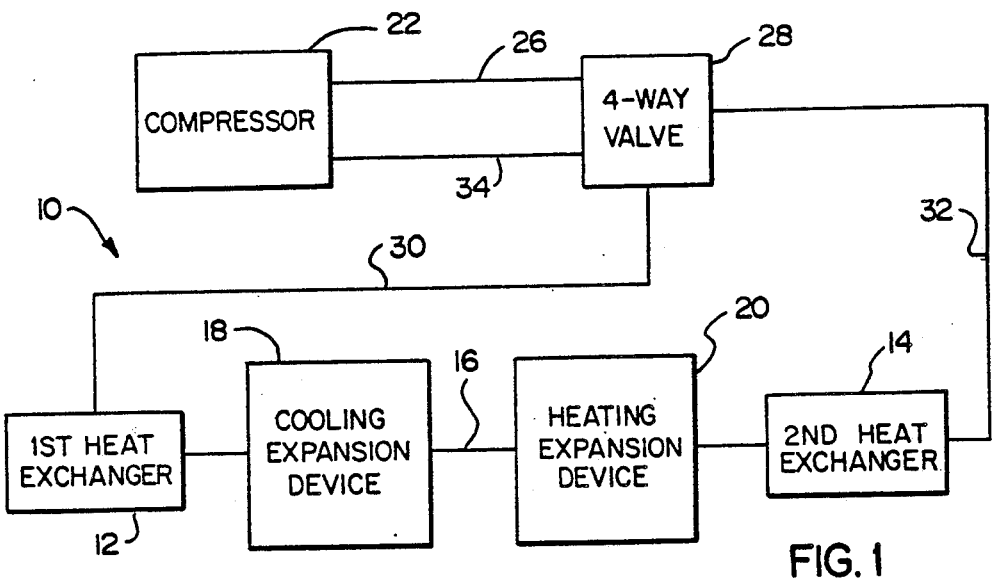
FIG. 1 is a diagrammatic representation of a heat pump system capable of being thermodynamically reversed to provide either heating or cooling, the system contains a heating expansion device according to the present invention.

Referring now to the drawings, FIG. 1 depicts a reversible refrigeration system or heat pump 10 which is adapted for providing either heating or cooling. The heat pump system 10 includes a first heat exchanger 12 and a second heat exchanger 14. The two heat exchangers are operatively connected to one another by a supply line 16 which contains two expansion devices, a cooling expansion device 18 and a heating expansion device 20 according to the present invention. The cooling expansion device 18 may be a device similar to those described in the background of the invention and is adapted to meter refrigerant flowing through the supply line in one direction while allowing substantially unrestricted flow of refrigerant therethrough in the opposite direction. The heating expansion device 20, as will be appreciated as the detailed description continues, meters refrigerant flow according to the demands of the heat pump system in one direction while also allowing substantially unrestricted flow of refrigerant therethrough in the opposite direction.

With continued reference to FIG. 1, the heat pump system includes a compressor 22 which is arranged so that the inlet piping 24 and the discharge piping 26 thereof are operatively associated with a four-way valve 28. The four-way valve, in turn, is operatively interconnected to the two heat exchangers 12 and 14 by way of refrigerant lines 30 and 32, respectively. By selectively positioning the four-way valve 28, the connection to the discharge side and suction side of the compressor may be reversed between the heat exchangers 12 and 14. In the cooling mode of operation, the suction line 24 of the compressor 22 is connected to heat exchanger 12 via refrigerant line 30 and the discharge line 26 is connected to the heat exchanger 14 via refrigerant line 32. As a result, heat exchanger 14 functions as a condenser, while heat exchanger 12 performs the duty of an evaporator. In the cooling mode, the refrigerant passing through the supply line 16 is metered from the high pressure condenser 14 to the low pressure evaporator 12 through the cooling expansion device 18. During such operation, the heating expansion device 20 allows free, unrestricted flow therethrough as will be understood when the device is described in detail hereinbelow.

When the heat pump system 10 is operated in the heating mode, the setting of the four-way valve 28 is reversed, thus changing the direction of refrigerant flow through the system. Accordingly, in the heating mode the hot gas discharged from the compressor via discharge line 26 is directed via refrigerant line 30 to the first heat exchanger 12 where it is condensed to a hot liquid state. The hot high pressure liquid refrigerant passes from the first heat exchanger 12 through the bypass openings of the cooling expansion device 18 and through interconnecting refrigerant line 16 to the heating expansion device 20 where it is metered in a controlled manner according to the present invention into the low pressure second heat exchanger 14 where it evaporates and absorbs heat from its external surroundings. The lower pressure refrigerant vapor passing from the evaporator coil 14 then returns to the compressor 22 via the compressor suction line 24 to complete the circuit.

It will be appreciated that in the heating mode of operation, the first heat exchanger 12, which functions as a condenser coil is the indoor coil and is transferring heat to the indoor air. Similarly, in the heating mode, the second heat exchanger 14 which functions as an evaporator coil is the outdoor coil and is extracting heat from the ambient air.

Referring now to FIGS. 2 and 4–6, the heating expansion device 20 includes a generally cylindrical housing portion 34 which defines a cylindrical elongated chamber 36 in the interior thereof. Extending from the sidewall of the body 34 is a fitting 38 having a male thread 40 formed on the exterior thereof and having a fluid passageway 42 formed therein which communicates the interior chamber 36 with the exterior thereof. The male thread 40 is adapted to mate with a female connector (not shown) associated with a refrigerant line to create a fluid tight joint therebetween.

The left hand end of the housing 34 is open ended and has a male thread 44 formed on the exterior thereof. The open end of the housing 34 is closed by an end fitting 46 which includes a cylindrical section 48 which has threads 50 formed in the interior thereof which mate with the threads 44 on the exterior of the body 34. A gasket 52 is adapted to be positioned adjacent the end 54 of the housing 34 and to sealingly engage a mating surface 56 formed within the end fitting 46 to assure a refrigerant tight joint therebetween. A reduced diameter nipple 58 extends from the left hand end of the end fitting 46. The nipple 58 has male threads 60 formed on the exterior thereof which are adapted to connect with an appropriate threaded connector associated with a refrigerant line as described above with respect to the side fitting 38. The nipple 58 further includes a fluid passageway 62 extending therethrough which communicates with the chamber 36. The passageway 62, the chamber 36, and the passageway 42 in the side fitting 38 together define a flow passage through the expansion device 20.

Extending from the interior wall 64 of the housing 34 at a location about midway along the length of the chamber is an annular inwardly extending flange 66 which defines an annular surface 68 facing to the left as viewed in the drawing figures.

Positioned within the chamber 36, to the left of the flange 66, is a flow metering piston 70 which is generally cylindrical in shape and which has a flow metering port 72 extending axially therethrough. The outside diameter of the piston 70 is such that the piston is received within the cylindrical chamber 36 with a clearance allowing free axially motion of the piston with respect to the housing 34. An annular groove 74 is formed in the outside surface 76 of the piston and a suitably sized o-ring 78 is adapted to be received therein in a manner such that it cooperates with the groove 74 and the inside cylindrical surface of the chamber 36 to preclude refrigerant flow between those surfaces when the device is in operation in a heat pump system.

The flow metering piston 70 further includes a plurality of fluid flow openings 80 extending axially therethrough which are parallel with the metering port 72. A centrally located, reduced diameter boss 82 extends from the left hand facing end surface 84 of the flow metering piston 70. The boss 82 has an annular groove 86, which defines an area of reduced diameter, formed therein immediately adjacent the left hand facing surface 84. The groove 86 is adapted to receive and retain a washer shaped flexible seal element 88 which has a central opening therethrough which defines an inner diameter which allows it to be received in and to be retained by the groove 86. The outer diameter of the seal 88 is slightly less than the outside diameter of the piston 70. The seal 88 is configured to overlie each of the plurality of fluid flow openings 80 and to prevent refrigerant flow through these openings when refrigerant is flowing through the device 20 from left to right as viewed in the drawings and to readily allow refrigerant flow therethrough when the flow is from right to left. In the preferred embodiment, the seal 88, which is basically a check valve, is fabricated from a synthetic resin, such as teflon.

Extending through the flow metering port 72 of the piston 70, is a refrigerant metering rod 90. The refrigerant metering rod 90 is an elongated rod having an enlarged portion 92 at the left hand end thereof, an intermediate portion 94 defining a flow metering geometry and a right hand end 96, which is adapted to be operatively attached to a left hand facing planar surface 98 which is part of a flexible bellows 100. The bellows 100 is adapted to support the rod 90 within the chamber 36 and to move the rod axially therewithin with respect to the flow metering piston 70 as will be described in more detail hereinbelow.

The enlarged end portion 92 of the rod 90 defines an annular planar surface 102 facing to the right as viewed in the drawing. The enlarged end 92 has a stepped down portion of reduced diameter which defines an outwardly facing surface 104 perpendicular to the surface 102. The surfaces 102 and 104 together cooperate to receive and support an o-ring seal 106 which is configured to cooperate with the boss 82 formed on the left hand facing surface of the piston 70 to thereby preclude the flow of refrigerant between these components when they are urged into sealing engagement. The seal 106 is made from a material, such as neoprene, which will swell when exposed to a refrigerant to assure retention of the seal in the described position on the rod 90.

The flow metering port 72 of the piston 70 and the flow metering geometry of the intermediate portion 94 of the metering rod 90 are sized such that the flow metering geometry bearing portion of the rod is readily received in the port 72 to allow free relative axial movement of the rod 90 with respect to the piston 70. The space defined between the flow metering port 72 and the flow metering geometry bearing portion 94 of the rod 90 is defined as the flow metering passage 108. The interaction between these components will be described in more detail hereinbelow. The bellows 100 is preferably made from a metallic material and is attached at its right h and end 101 to the left end facing interior end wall 112 of the housing 34. The attachment is achieved by brazing, soldering or a like manner such that the interior of the bellows 100 is isolated from the refrigerant flowing through the expansion device 20. The interior of the bellows 114 is vented to atmospheric pressure via an opening 116 provided in the end wall of the housing 34. A helical spring 118 is axially positioned within the interior of the bellows 100. The spring 118 reacts against the left hand facing interior end wall 112 of the chamber 36, at one end thereof, and against the opposite face of the end 98 of the bellows to which the end 96 of the refrigerant metering rod is attached. The spring 118 urges the bellows 100 and the metering rod 90 carried thereby to the left as viewed in the drawing figures. The spring rate of the helical spring 118 is selected, in conjunction with a pressure balance analysis of the bellows, such that it will operate in a desired manner to optimize the expansion area, i.e., flow metering passage 108, defined by the flow metering rod 90 and the piston 70 in a selected system at selected operating conditions.

As pointed out above, when the expansion device 20 is installed in a heat pump system, the side fitting 38 is in fluid communication with the outside coil which is the evaporator of the heat pump system, which is, as well known in the art, referred to as the low pressure side of the system. The other refrigerant end fitting 46 is in fluid communication with the indoor, or condensing coil of the heat pump system which is referred to as the high pressure side of the system. Accordingly, the portion of the interior chamber 36 of the expansion device to the left of the piston may be referred to as a high pressure portion of the device whereas the portion of the chamber 36 to the right of the piston may be referred to as a low pressure portion of the device. As pointed out above, the interior of the bellows, vented through opening 16, is at atmospheric pressure.

Figure 2:
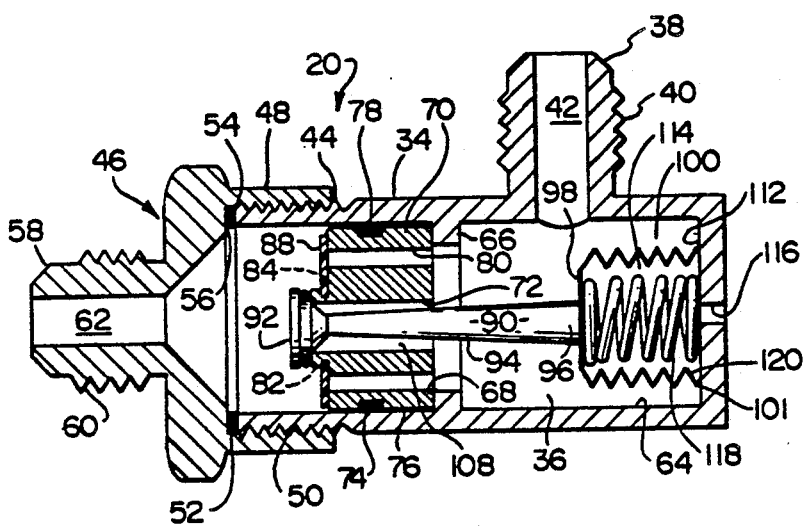
FIG. 2 is a longitudinal sectional view through a variable area heating expansion device according to the present invention.

FIG. 2 shows the expansion device 20 with the internal components in the position which they will be in when the device is installed in an operating system and the system is shut off. Under these conditions there is a positive pressure within the system which results in a force acting on the bellows which exceeds the combined force exerted on the bellows by the spring and atmospheric pressure As a result, this force causes the rod 90 to be biased to the right and the enlarged end 92 of the rod 90 in turn biases the o-ring 106 carried by the rod into sealing engagement with the boss 82 on the piston. This arrangement allows the system to maintain a pressure differential between the high and low pressure side of the system when the system is shut off. As a result, the degradation coefficient $c_d$ of the refrigeration system is reduced. The degradation coefficient is a term defined by the U.S. Department of Energy which relates to the measure of the efficiency loss of the system due to the cycling of the system.

The operation of the heat pump metering device 20 is quite simple. When the heat pump system 10 is started up, the compressor 22 begins to run and the pressure in the evaporator 14 or low side begins to decrease. The forces acting on the bellows 100 will come to an equilibrium and eventually the forces will allow the spring 118 to move the bellows and the rod 90 to the left to thereby move the o-ring 106 out of sealing engagement with the piston 70 and allow refrigerant to be metered through the flow metering passage 108. It should be noted that, once the rod 90 has moved to the left an appreciable distance, the flow metering passage 108 will be at its maximum value. This is consistent with the requirement in a heat pump mode of operation of a refrigeration system that the refrigerant flow rate be greater at higher evaporator pressures.

Consistent with the above, as the evaporator pressure decreases (as a result of decreasing outdoor temperature) the device will allow the rod 90 to move further to the left, thereby reducing the size of the flow metering passage 108, and decreasing the refrigerant flow rate. This decrease in flow is commensurate with the lower compressor pumping rate at the lower suction pressure.

While the device is designed to allow maximum flow at high ambient temperatures, it is also designed such that the device will shut off the refrigerant flow at extremely high ambient pressures (high suction pressure) to act as a maximum operating pressure limiter. What happens under these conditions is that the high pressure in the evaporator, acting to move the bellows to the right exceeds, the combined forces due to atmospheric pressure and the force of the spring and accordingly the enlarged end 92 of the refrigerant metering rod brings the o-ring 106 carried thereby into sealing engagement with the boss 82 on the piston 70 thereby preventing further refrigerant flow through the device.

Figure 4:
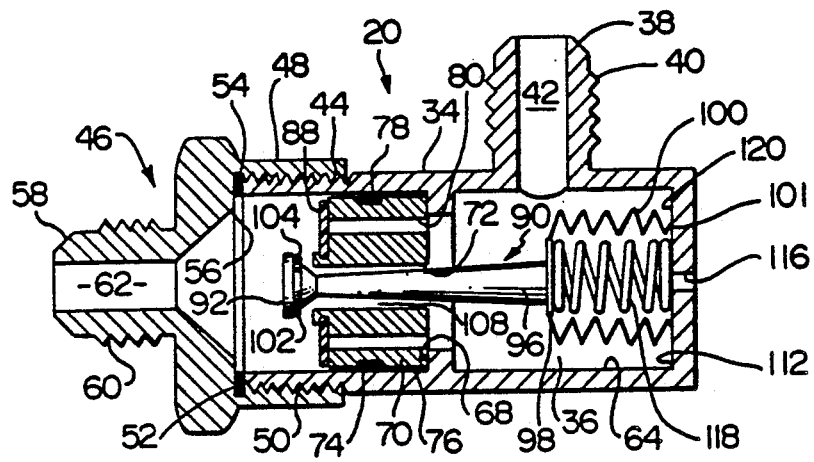
FIG. 4 is a longitudinal sectional view of a heating expansion device of the type shown in FIG. 2 showing the condition of the device during a high ambient temperature condition.

Looking now at the other drawing figures, FIG. 4 shows the device 20 in a condition which represents a high outdoor temperature and the high evaporator pressure which accompanies this condition. For example, this might represent the condition of the metering device at an ambient temperature of 47° F. Under such conditions evaporator pressure would be 85 psia, and, taking the ambient pressure as 15 psia, the pressure differential between the evaporator pressure and atmospheric would be 70 psia.

Figure 5:
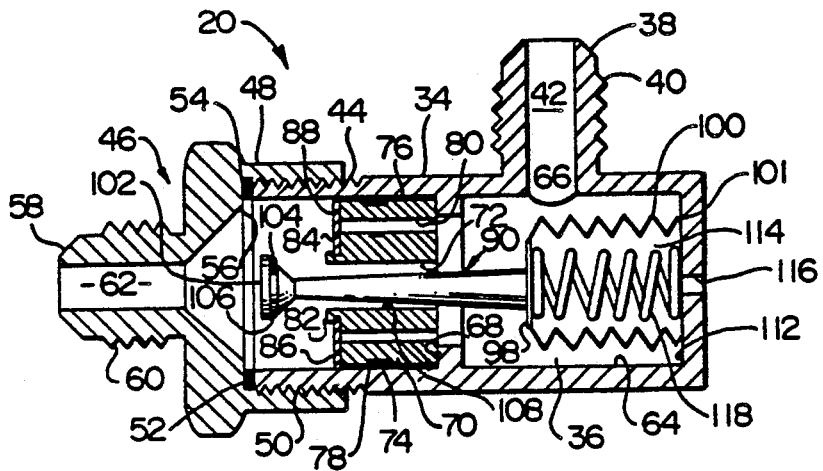
FIG. 5 is a longitudinal sectional view of a heating expansion device of the type shown in FIG. 2 showing operation of the device during a low ambient temperature condition.

FIG. 5 represents the condition of the device 20 at a relatively low outdoor temperature and the accompanying relatively low evaporator pressure. As an example, an outdoor temperature of 17° F. would result in an evaporator pressure of 45 psia which would result in a pressure differential of only 30 psi thereby allowing the spring to move the bellows and rod a substantial distance to the left thereby substantially decreasing the size of the refrigerant flow metering passage 108.

Figure 6:
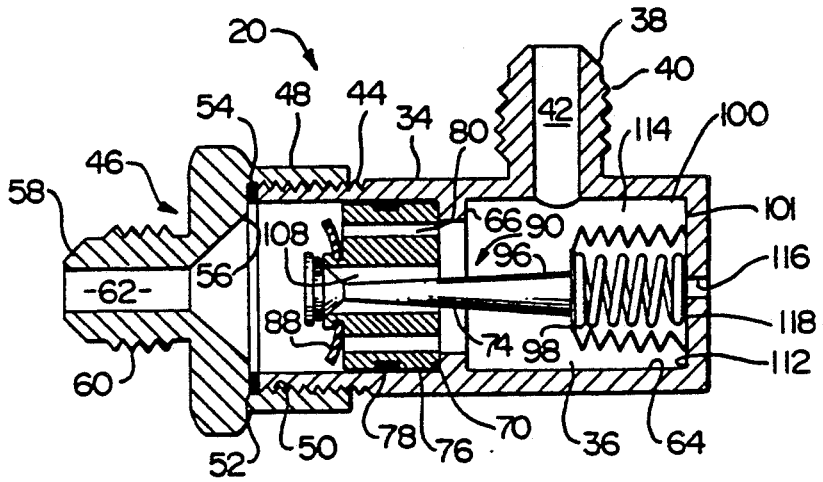
FIG. 6 is a longitudinal sectional view of a heating expansion device of the type shown in FIG. 2 showing operation of the device in the cooling or bypass mode of operation.

FIG. 6 illustrates the expansion device 20 in bypass operation wherein refrigerant is flowing from right to left as viewed in the drawing figure. Under these conditions, the flow of refrigerant through the bypass openings 80 in the piston causes the flexible seal element 88 to lift from the face of the piston to allow a substantially unrestricted flow through the piston in that direction. In order to assure that the flow is unrestricted, the combined cross-sectional area of the openings 80 is designed to equal or exceed the inside cross-sectional area of the supply line in which the device is connected.

As set forth above, as a general rule in a heat pump system it has been found that the cross-sectional area of the rod 90 should progress from a smaller value adjacent the enlarged end 92 to a larger cross-sectional area as the other end of the rod attached to the bellows is approached. The relationship thus established satisfies the operating conditions summarized above in that the flow metering passage 108 defined by the metering port and the rod is smaller at low outdoor temperatures and is larger at high outdoor temperatures. Custom designing the expansion device 20 to a particular operating system is readily facilitated by analyzing the forces acting on the opposite sides of the end wall 98 of the bellows. The following equation sets forth these forces: $F = \Delta PA = Kx$. In the forgoing equation, the variables and constants used are defined as follows:

$\Delta P$ = Evaporator pressure (low side) — atmospheric pressure
$A$ = Area of the end wall of the bellows to which the spring is attached.
$K$ = The spring rate
$x$ = Rod travel Using the above equation, along with well know refrigeration design techniques, a design engineer is able to design an expansion device which is capable of controlling the flow of refrigerant in a heat pump system at optimum conditions over a wide range of operating conditions. The object of the design is to provide an optimum expansion area for a variety of different operating conditions. This is achieved by changing the cross-sectional area of the rod by machining or forming a flow metering geometry on the intermediate portion 94 of the rod.

The two different ambient temperature conditions cited above, for example, may be used to design a flow metering geometry which is responsive to the expected operating conditions of the system. Given these test conditions, an optimum expansion orifice cross-sectional area and corresponding pressure differentials between high and low sides of a given system may be readily determined using well known design techniques. With this information available, the only unknown in the above equation is x, i.e., the movement of the rod. Solving the equation for x tells the designer that the cross-sectional area of the rod at a certain point along the rod, and the cross-sectional area of the flow metering port 72 must cooperate to define a flow metering passage cross-section 108 which equals the previously determined optimum expansion area.

Following these steps for a number of other operating conditions provides the designer with a number of optimum expansion areas at different locations along the rod. With this information the size of the flow metering port 72 in the piston 70 and the size and the configuration of the geometry of the flow metering rod may be selected such that the flow metering passageway 108 defined in the space between these two elements provides the desired optimum expansion area for given conditions at corresponding positions along the rod.

Figure 3:
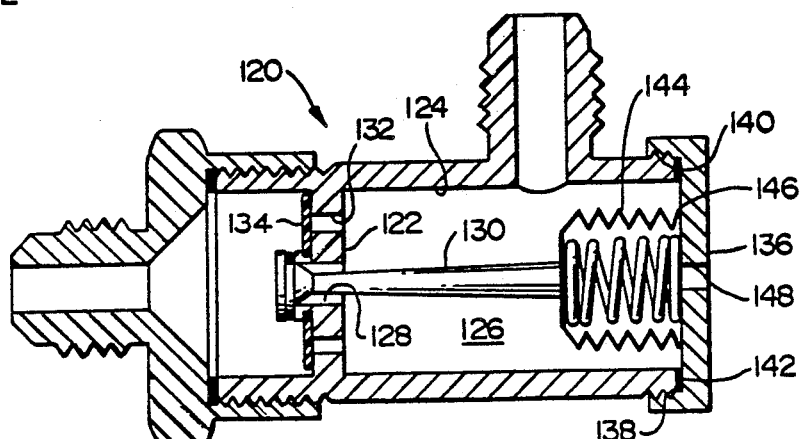
FIG. 3 is a longitudinal sectional view through another embodiment of a variable area heating expansion device according to the present invention.

The expansion device described hereinabove, in connection with FIGS. 2 and 4-6, is a device wherein the flow metering piston 70 is movable within the housing 34 As a result, the piston is readily removable from the housing and is readily interchangeable with other pistons having the same outside diameter. As a result, substitute pistons having different size flow metering ports 72, may be readily interchanged with one another to facilitate matching a particular expansion device 20 to the requirements of a particular system. FIG. 3 illustrates a heating expansion device 120 making use of the principals of the present invention wherein the moveable piston 70 is replaced by a fixed flow metering wall 122 formed directly in the interior wall 124 of the interior chamber 126 of the expansion device 120. In this embodiment, the flow metering port 128 is an opening formed directly in the flow metering wall 122.

The cooperation between the flow metering port 128 and the flow metering rod 130 received therein is the same as that described above with respect to the embodiment of FIGS. 2, 4-6. The wall 122 comprises refrigerant bypass structure including flow passages 132 and a seal assembly 134 substantially identical to that carried by the flow metering piston 70 of the previously described embodiment.

Assembly of the embodiment shown in FIG. 3 may be facilitated by attaching the enlarged head portion 136 to the flow metering rod 130 by means, such as a threaded connection (not shown) after the rod 130 has been inserted through the flow metering port 128. The bellows 144 and rod 130 assembly, prior to assembly to the enlarged head, may be appropriately hermetically attached, as at 146, to a right hand end cap 137, having internally formed threads 138 therein which are adapted to threadably engage mating threads 140 provided on the right hand end of the body of the flow metering device 122 to thereby sealingly engage the body. An annular gasket 142 is disposed therebetween to assure a fluid tight connection As with the above described embodiment, the interior of the bellows 144 is vented to the atmosphere through a suitable opening 148 provided in the right hand end cap.

Accordingly, it should be appreciated, that a refrigerant expansion device has been provided which is particularly adaptable to heat pump applications wherein the flow of refrigerant in the expansion device is such that a reduced flow is achieved at low ambient temperatures and an increased flow is allowed at higher ambient temperatures. Such flow metering is achieved as a function of the pressure differential between the low pressure side of the system and atmospheric pressure.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

What is claimed is:

1. An expansion device for metering the flow of refrigerant therethrough comprising:
   a housing having a flow passage therethrough;

a partition disposed within said flow passage, said partition having a flow metering port extending longitudinally therethrough, said partition dividing said flow passage into a high pressure portion and a low pressure portion;

an elongated member extending into said metering port, said elongated member and said metering port cooperating to define a flow metering passage therebetween, said elongated member being configured to vary the cross-sectional area of said flow metering passage in relation to the position of said member to said port, one end of said elongated rod extending into said low pressure portion of said flow passage;

means for supporting said elongated member within said flow passage and for controlling the axial position of said elongated member within said passage in response to the differential pressure between refrigerant in said low pressure portion and atmospheric pressure;

said means for supporting and controlling comprising a flexible bellows disposed within said low pressure portion of said flow passage, said bellows being axially expansible or contractible in response to the forces acting on one end thereto; and said one end of said elongated member being attached to said one end of said bellows, said elongated member including a flow metering geometry bearing portion which decreases in cross-sectional area from a maximum at said one end of said rod attached to said bellows to a minimum at the other end thereof.

2. The apparatus of claim 1 including a helical spring coaxially disposed with said bellows within said housing, said spring interacting with said bellows to control the axial position of said elongated member.

3. The apparatus of claim 2, wherein said spring is located within said bellows and acts upon the side of said one end of said bellows which is within said bellows, the force of said spring acting to expand said bellows.

4. The apparatus of claim 1, wherein said other end of said elongated member extends into said high pressure portion of said flow passage, said other end of said member carrying an enlarged portion thereupon which is larger in diameter than said metering port, said enlarged portion being configured to prevent flow of refrigerant through said metering port when in contact with the portion of said partition in which said metering port is formed.

5. The apparatus of claim 4, wherein refrigerant is metered through said expansion device in the direction from said high pressure portion thereof to said low pressure portion; and wherein said partition comprises a plurality of bypass flow passages therethrough, extending substantially parallel to said flow metering port, and, including, means carried by said partition which prevent flow of refrigerant through said bypass ports when refrigerant is flowing from said high pressure portion to said low pressure portion and which allow substantially unrestricted flow through said device when refrigerant is flowing in the opposite direction therethrough.

6. An expansion device for metering the flow of refrigerant therethrough in one direction and allowing substantially unrestricted flow of refrigerant therethrough in the opposite direction which comprises:

a body having a flow passage therethrough for passing a flow of refrigerant in either direction, said flow passage including first and second flow openings and a chamber interconnecting said flow openings, said body having an internally extending stop means therewithin positioned intermediate said flow passage;

a piston having a flow metering port passing therethrough, said piston being slideably mounted within said chamber for movement along said flow passage and into stopping engagement with said internally extending stop;

an elongated rod axially disposed within said chamber, said rod having a flow metering geometry formed thereon, said rod extending through said metering port of said piston, said metering port and said flow metering geometry of said rod cooperating to define a flow metering passage therebetween;

means for supporting said rod within said chamber and for controlling the axial position of said rod within said chamber in response to the differential pressure between refrigerant flowing through said expansion device at said second flow opening and atmospheric pressure.

7. The apparatus of claim 6, wherein said first flow opening serves as an inlet, and said second flow opening serves as an outlet, during metering operation of said expansion device; and, wherein said means for supporting and controlling the axial position of said elongated rod comprises:

a flexible bellows axially disposed within said low pressure portion of said flow passage, said bellows being axially expansible or contractible in response to the forces acting on one end thereof, one end of said elongated rod being attached to said one end of said bellows; the exterior of said bellows, including said one end, being exposed to refrigerant in said low pressure portion of said flow passage, and, the interior of said bellows being vented to atmospheric pressure.

8. The apparatus of claim 7 including a helical spring coaxially disposed with said bellows within said low pressure portion of said flow passage, said spring interacting with said bellows to control the axial position of said elongated rod.

9. The apparatus of claim 8, wherein said spring is located within said bellows and acts upon the side of said one end of said bellows which is within said bellows, the force of said spring acting to expand said bellows.

10. The apparatus of claim 7, wherein said flow metering geometry decreases in cross-sectional area from a maximum at said one end of said rod attached to said bellows to a minimum at the other end thereof.

11. The apparatus of claim 10, wherein said other end of said elongated rod extends into said high pressure portion of said flow passage, said other end of said rod carrying an enlarged portion thereupon which is larger in diameter than said metering port, said enlarged portion being configured to prevent flow of refrigerant through said metering port of said piston, when in contact with the portion of said piston in which said metering port is formed.

12. The apparatus of claim 11, wherein said piston comprises a plurality of bypass flow passages therethrough extending substantially parallel to said flow metering port and, including, means carried by said piston for preventing the flow of refrigerant through said bypass passages when refrigerant is flowing from said high pressure portion to said low pressure portion and for allowing substantially unrestricted flow through said device when refrigerant is flowing in the opposite direction therethrough.

* * * * *